United States Patent
Allen

(10) Patent No.: US 11,262,177 B2
(45) Date of Patent: Mar. 1, 2022

(54) THREE-DIMENSIONAL SCANNING WITH FUNCTIONAL ELEMENTS

(71) Applicant: Hewlett-Packard Development Company, L.P., Spring, TX (US)

(72) Inventor: William J. Allen, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 143 days.

(21) Appl. No.: 16/471,693

(22) PCT Filed: Feb. 2, 2017

(86) PCT No.: PCT/US2017/016260
§ 371 (c)(1),
(2) Date: Jun. 20, 2019

(87) PCT Pub. No.: WO2018/143994
PCT Pub. Date: Aug. 9, 2018

(65) Prior Publication Data
US 2019/0346248 A1    Nov. 14, 2019

(51) Int. Cl.
*G01B 5/20* (2006.01)
(52) U.S. Cl.
CPC ..................... *G01B 5/20* (2013.01)
(58) Field of Classification Search
CPC ........................................................ G01B 5/20
USPC ........................................................ 702/168
See application file for complete search history.

(56) References Cited

U.S. PATENT DOCUMENTS

| | | | |
|---|---|---|---|
| 5,822,877 A | 10/1998 | Dai | |
| 6,701,633 B2 | 3/2004 | Ohtsuka | |
| 8,532,368 B2* | 9/2013 | Se | G06T 7/579 |
| | | | 382/154 |
| 9,150,263 B2 | 10/2015 | Bernstein et al. | |
| 9,262,788 B1 | 2/2016 | Freeman et al. | |
| 9,429,940 B2 | 8/2016 | Bernstein et al. | |
| 9,442,061 B1 | 9/2016 | Boyer et al. | |
| 2005/0058336 A1* | 3/2005 | Russell | G06T 7/596 |
| | | | 382/154 |
| 2005/0137827 A1 | 6/2005 | Takamiya | |
| 2011/0029470 A1* | 2/2011 | Hartmann | G01B 5/20 |
| | | | 706/16 |

(Continued)

FOREIGN PATENT DOCUMENTS

| | | |
|---|---|---|
| RU | 2474787 C1 | 2/2013 |
| WO | WO-2015117099 A1 | 8/2015 |

OTHER PUBLICATIONS

Ebrahim, M., 3D Laser Scanners' Techniques Overview, Oct. 2015, <https://www.ijsr.net/archive/v4i10/SUB158346.pdf>.

*Primary Examiner* — Ricky Go
(74) *Attorney, Agent, or Firm* — Dicke Billig & Czaja PLLC

(57) ABSTRACT

A system for three-dimensional scanning of an object includes a set of functional elements, with each of the functional elements including a housing and a processor, memory, power supply, sensor, and wireless communication module each within the housing, a position module to determine an individual position of each of the functional elements after the object is in the set of functional elements, and a contour module to determine a shape of the object based on the individual position of each of the functional elements and a void of functional elements created by the object in the set of functional elements.

15 Claims, 11 Drawing Sheets

(56) References Cited

U.S. PATENT DOCUMENTS

2012/0025803 A1 2/2012 Kato
2014/0375769 A1 12/2014 Algreatly
2016/0012646 A1* 1/2016 Huang .................... G06T 5/005
            345/419

* cited by examiner

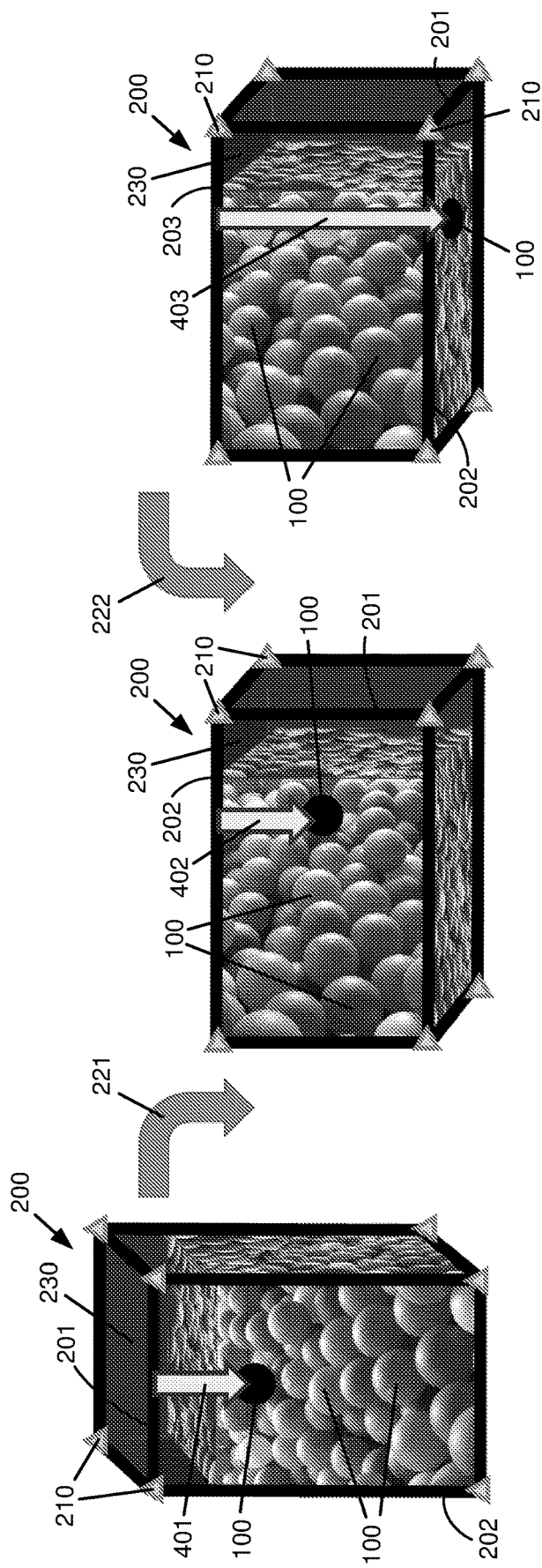

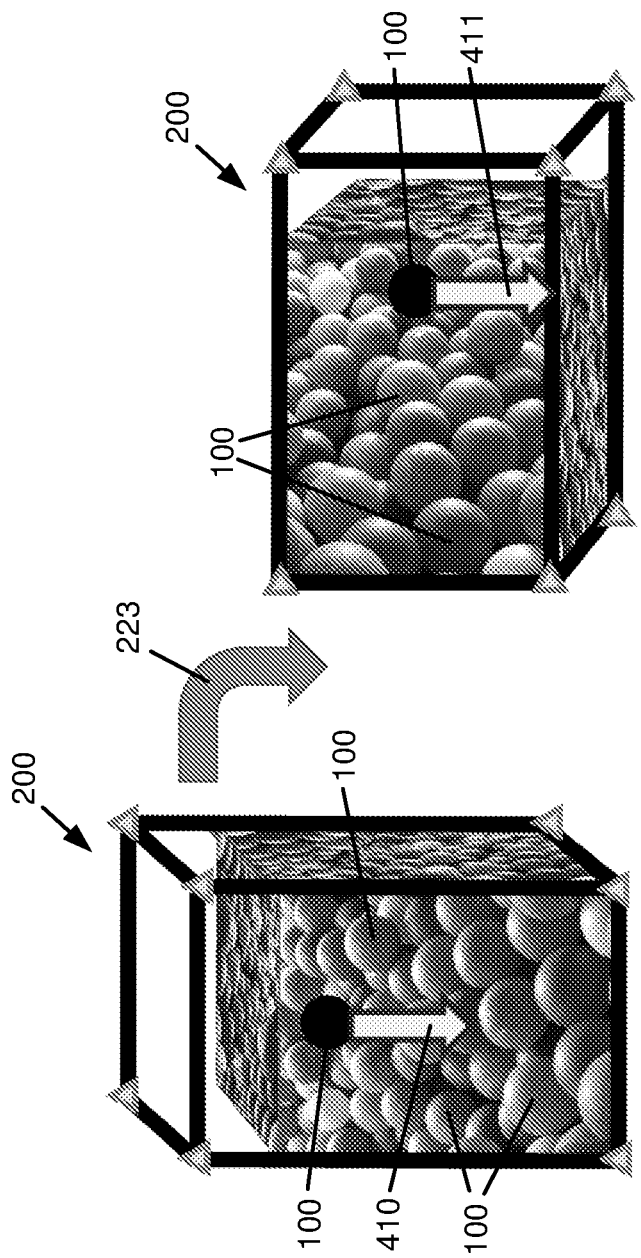

THREE-DIMENSIONAL SCANNING WITH FUNCTIONAL ELEMENTS

BACKGROUND

The Internet of Things (IoT) may include smart objects with embedded technology to sense, communicate and/or interact with their internal states, each other, and/or their external environment.

BRIEF DESCRIPTION OF THE DRAWINGS

FIGS. 5A, 5B, 5C schematically illustrate another example of determining a position of a functional element.

FIGS. 6A, 6B schematically illustrate an example of determining an orientation of a functional element.

DETAILED DESCRIPTION

Figure 1:
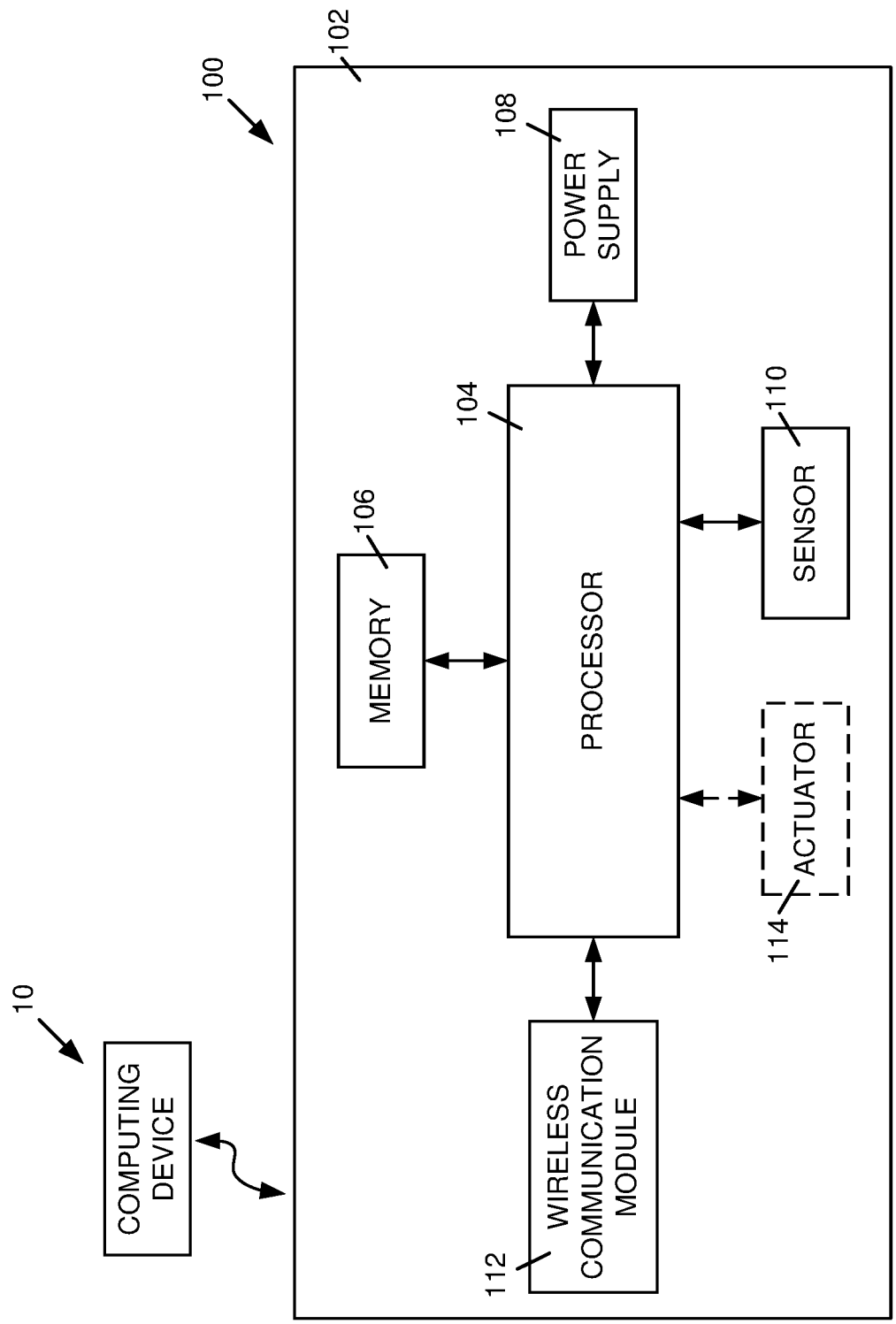
FIG. 1 is a block diagram illustrating an example of a functional element.

FIG. 1 is a block diagram illustrating an example of a functional element 100. In one implementation, functional element 100 includes a shell or housing 102 with components, such as a processor 104, memory 106, power supply 108, sensor 110, and wireless communication module 112, provided within housing 102.

Processor 104 transfers, communicates, and/or processes signals, commands, conditions, states, and/or parameters for and/or between components of functional element 100, and may include analog and/or digital elements and/or circuits. In examples, processor 104 implements and/or executes computer-readable, computer-executable instructions for data processing functions and/or functionality of functional element 100. In examples, such instructions are stored in memory, such as memory 106. Memory 106 may include volatile and non-volatile memory, and includes a non-transitory computer-readable storage medium suitable for tangibly embodying program instructions and data. Power supply 108 provides energy for operating components of functional element 100. In one implementation, power supply 108 is a rechargeable battery.

Sensor 110 provides information about one or more than one operating and/or environmental condition and/or state of functional element 100. In examples, sensor 110 includes one or more than one instrument or device for reading, detecting, measuring, indicating, and/or responding to a condition and/or state of functional element 100, including, for example, position, orientation, gravitational force, magnetic force, and/or ambient or environmental conditions such as temperature, humidity, and/or pressure.

Wireless communication module 112 facilitates the exchange and/or transmission of information and/or data between functional element 100 and another device or system, including an external device such as, for example, computing device 10. Such information and/or data may include, for example, control and/or logic instructions or commands, condition or state information, as well as other information and/or data to be exchanged with and/or transmitted to and/or from functional element 100.

In some examples, functional element 100 includes an actuator 114. Actuator 114 includes, operates, and/or controls one or more than one mechanism or mechanical element, component, or system of functional element 100.

Figure 2:
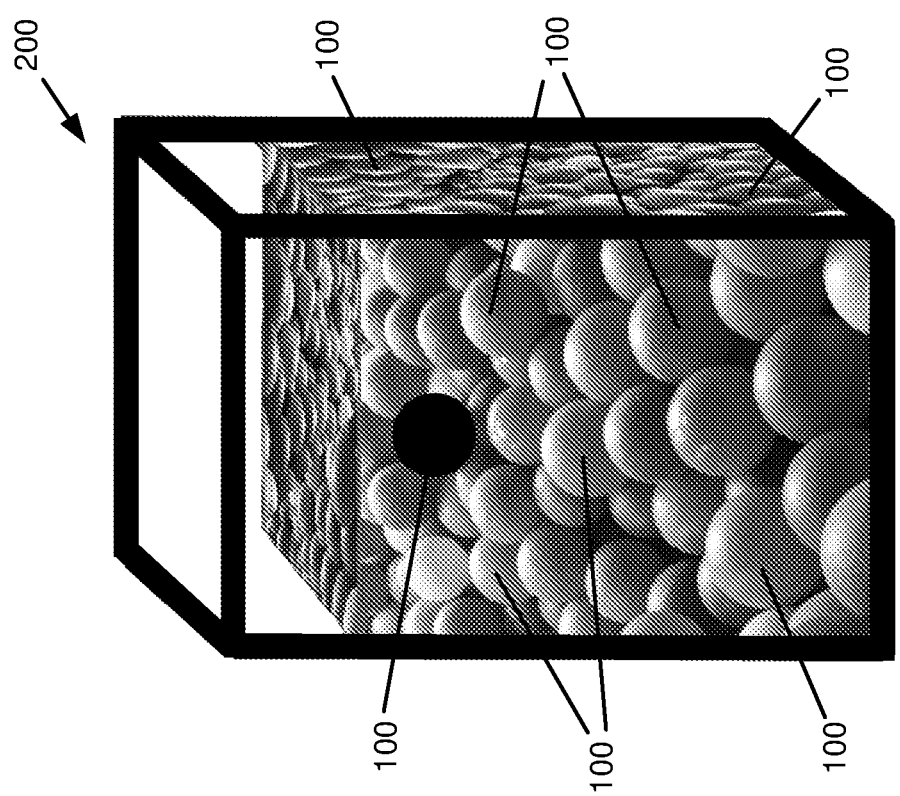
FIG. 2 is a schematic illustration of an example of a plurality of functional elements.

FIG. 2 is a schematic illustration of an example of a plurality of functional elements 100. In one implementation, functional elements 100 are individually addressable such that information and/or data of and/or for each functional element 100 of the plurality of functional elements 100 may be serialized or individualized. As such, information and/or data exchanged with and/or transmitted to and/or from an individual functional element 100, for example, via wireless communication module 112, may be recognized and/or identified as being from a specific functional element 100. For example, as described below, a pose (position/location and/or orientation) of a functional element 100 (of a plurality of functional elements 100) may be individually determined and serialized such that transmission of the determined pose may be recognized and/or identified as being of a specific functional element 100.

As illustrated in the example of FIG. 2, a collection, set, accumulation, or grouping of functional elements 100 is provided or established. In one implementation, functional elements 100 are spherical in shape. Functional elements 100, however, may be of other shapes, including, for example, polyhedral shapes, such as dodecahedral. In addition, functional elements 100 may be irregularly shaped, and may be of different shapes and/or different sizes relative to each other.

In the illustrated example, functional elements 100 are held or contained by or within an enclosure or container 200. Although illustrated as being a rectangular prism, container 200 may be of other shapes and/or sizes. In other examples, functional elements 100 are accumulated, grouped, and/or maintained in a pile or mound without an enclosure or container.

It is to be understood that FIG. 2 is a schematic representation of a collection, set, accumulation, or grouping of functional elements 100 within container 200. Although illustrated with a void between a top of the functional elements 100 and a top of container 200, the void may be filled with additional functional elements and/or a fill material. In addition, the number of functional elements 100 within container 200 may vary such that the number of functional elements 100 within container 200 may be more or less than that illustrated.

In one example, the collection, set, accumulation, or grouping of functional elements 100 is random such that an initial pose of each functional element 100, for example, within container 200, is unknown. In one implementation, each functional element 100 includes six degrees of freedom, namely translation in three perpendicular axes and rotation about the three perpendicular axes. As such, a pose of each functional element 100 includes three degrees of position (location) and three degrees of orientation. For example, the three degrees of position include x, y, and z coordinates, and the three degrees of orientation include degrees of rotation about x, y, and z axes. More specifically, the three degrees of position include, for example, surge (movement forward and backward along an x-axis), sway (movement left and right along a y-axis), and heave (movement up and down along a z-axis), and the three degrees of orientation include, for example, roll (tilting side to side about the x-axis), pitch (tilting forward and backward about the y-axis), and yaw (left and right turning about the z-axis). With a collection, set, accumulation, or grouping of functional elements 100, the pose of each functional element 100 may be established relative to each other and/or relative to an environment or surrounding, such as container 200.

Figure 3:
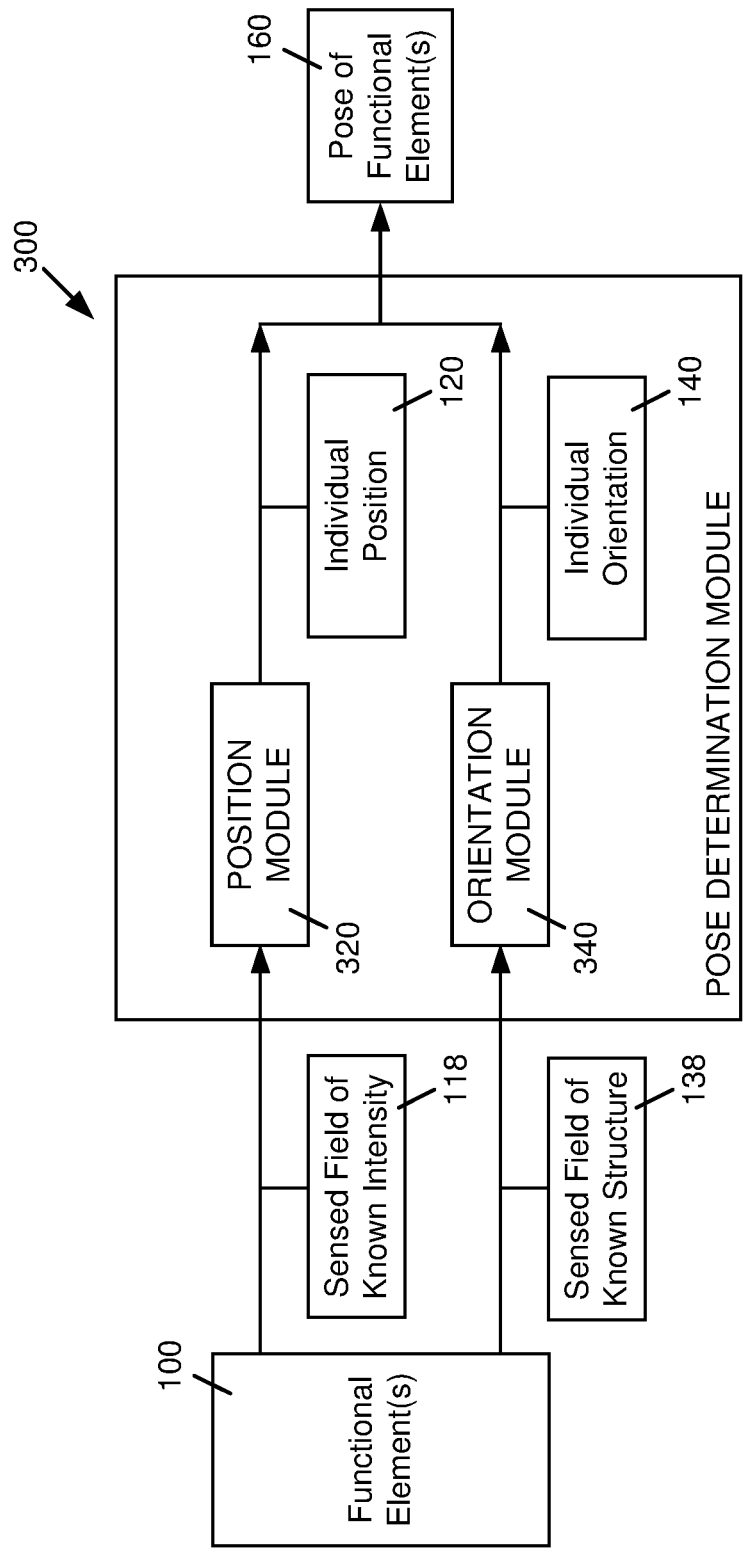
FIG. 3 is a block diagram illustrating an example of determining a pose of a functional element.

FIG. 3 is a block diagram illustrating an example of determining a pose of a functional element. In examples, as described below, a pose determination unit or module 300 determines a pose of a functional element 100, including an individual position and an individual orientation of a respective functional element 100, based on a condition or conditions sensed by a respective functional element 100.

In one implementation, as schematically illustrated in FIG. 3, pose determination module 300 includes a position unit or module 320, and an orientation unit or module 340. As described below, position module 320 determines an individual position 120 of a respective functional element 100, and orientation module 340 determines an individual orientation 140 of a respective functional element 100, such that an individual pose 160 of the respective functional element 100 may be established from individual position 120 and individual orientation 140.

Pose determination module 300 includes hardware, software, firmware, or a combination of these. In one implementation, pose determination module 300 is included in a computer, computer server, or other microprocessor-based system capable of performing a sequence of logic operations. Components of pose determination module 300, including position module 320, and/or orientation module 340, can be implemented in hardware via a microprocessor, programmable logic device, or state machine, in firmware, or in software within a given device. Position module 320, and/or orientation module 340 may be implemented, for example, as a subroutine of a computer program. Pose determination module 300, including position module 320, and/or orientation module 340, can be implemented, wholly or in part, on a respective functional element 100 or on an external device, such as computing device 10 (FIG. 1).

In one implementation, position module 320 determines individual position 120 based on a field with a known intensity sensed by a respective functional element 100, as described below. As such, position module 320 receives, as input, a measure of a sensed field of known intensity 118 from a respective functional element 100. The field of known intensity may be sensed, for example, by an implementation of sensor 110 (FIG. 1) of a respective functional element 100. In one implementation, the measure of the sensed field of known intensity 118 is transmitted or communicated to pose determination module 300, including, more specifically, position module 320, via wireless communication module 112 (FIG. 1) of the respective functional element 100.

In one implementation, orientation module 340 determines individual orientation 140 based on a field with a known structure sensed by a respective functional element 100, as described below. As such, orientation module 340 receives, as input, a measure of a sensed field of known structure 138 from a respective functional element 100. The field of known structure may be sensed, for example, by an implementation of sensor 110 (FIG. 1) of a respective functional element 100. In one implementation, the measure of the sensed field of known structure 138 is transmitted or communicated to pose determination module 300, including, more specifically, orientation module 340, via wireless communication module 112 (FIG. 1) of the respective functional element 100.

Figures 4A, 4B, 4C:
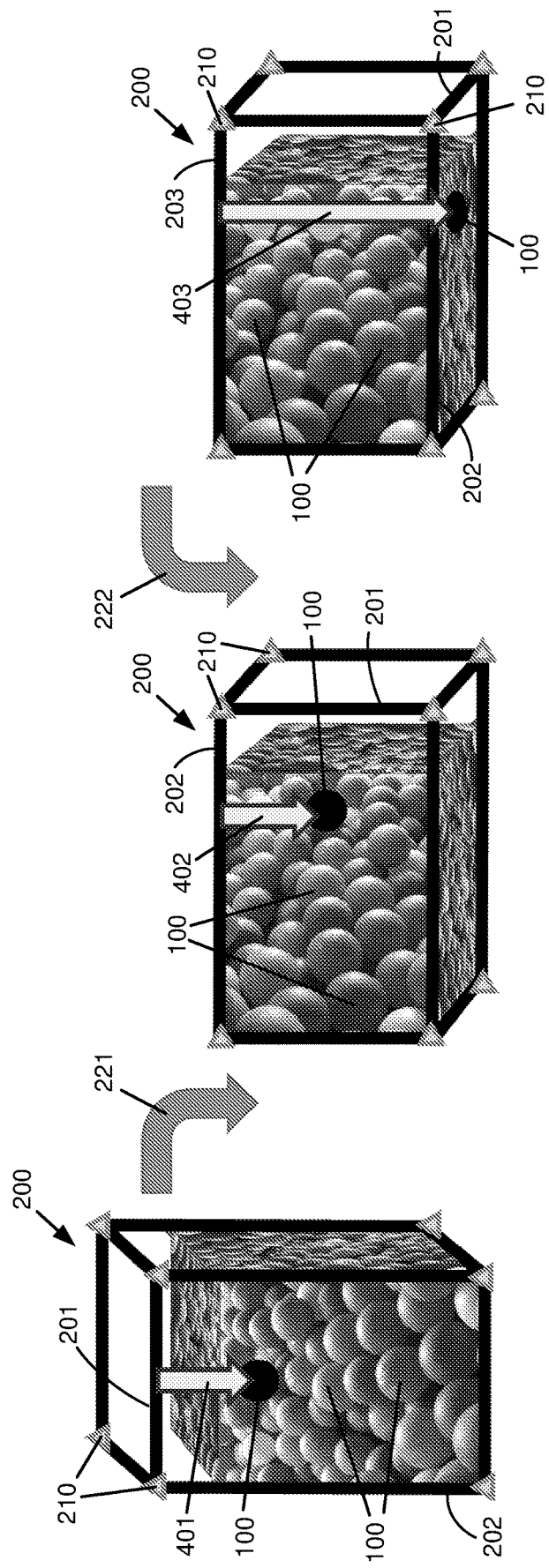
FIGS. 4A, 4B, 4C schematically illustrate an example of determining a position of a functional element.

FIGS. 4A, 4B, 4C schematically illustrate an example of determining a position of a functional element, such as individual position 120 of a respective functional element 100. In one example, as described above, determination of individual position 120 is based on a field with a known intensity, including, more specifically, a field with a known intensity profile, intensity gradient, or three-dimensional intensity. In one implementation, the field of known intensity is ambient pressure, including, more specifically, atmospheric pressure (i.e., air pressure or gas pressure). As such, the field of known intensity may be sensed, for example, by an altimeter, as an example of sensor 110 of a respective functional element 100.

As illustrated in the example of FIG. 4A, container 200, with functional elements 100 therein, is positioned in or has a first orientation. With the first orientation, atmospheric pressure at a respective functional element 100 is measured such that a "depth" or position of the respective functional element 100 relative to a first surface, face, or boundary of container 200, such as boundary 201, is resolved, as represented, for example, by arrow 401. As such, a first positional coordinate, such as an x-coordinate, of the respective functional element 100 is determined. In one implementation, container 200 includes a transmitter or sensor 210 at one or more known locations such that a sensed measurement by a respective functional element 100 is compared with a sensed measurement by sensor 210.

As illustrated in the example of FIG. 4B, container 200, with functional elements 100 therein, is positioned in or has a second orientation. With the second orientation, atmospheric pressure at the respective functional element 100 is measured such that a "depth" or position of the respective functional element 100 relative to a second surface, face, or boundary of container 200, such as boundary 202, is resolved, as represented, for example, by arrow 402. As such, a second positional coordinate, such as a y-coordinate, of the respective functional element 100 is determined.

As illustrated in the example of FIG. 4C, container 200, with functional elements 100 therein, is positioned in or has a third orientation. With the third orientation, atmospheric pressure at the respective functional element 100 is measured such that a "depth" or position of the respective functional element 100 relative to a third surface, face, or boundary of container 200, such as boundary 203, is resolved, as represented, for example, by arrow 403. As such, a third positional coordinate, such as a z-coordinate, of the respective functional element 100 is determined.

In one example, container 200, with functional elements 100 fixed therein, is re-oriented or rotated, as represented by arrow 221, between the first orientation of FIG. 4A and the second orientation of FIG. 4B, and re-oriented or rotated, as represented by arrow 222, between the second orientation of FIG. 4B and the third orientation of FIG. 4C. In one implementation, container 200 is rotated ninety degrees between the first orientation and the second orientation, and rotated ninety degrees between the second orientation and the third orientation such that the second orientation of FIG. 4B is orthogonal to the first orientation of FIG. 4A, and the third orientation of FIG. 4C is orthogonal to both the first orientation of FIG. 4A and the second orientation of FIG.

4B. Although illustrated as being rotated ninety degrees between the first orientation and the second orientation, and rotated ninety degrees between the second orientation and the third orientation, container 200, with functional elements 100 fixed therein, may be rotated a different amount (or amounts) between the first orientation and the second orientation, and/or between the second orientation and the third orientation such that the rotation (or rotations) include a non-zero orthogonal vector component (e.g., 30 degrees, 120 degrees).

FIGS. 5A, 5B, 5C schematically illustrate another example of determining a position of a functional element, such as individual position 120 of a respective functional element 100. In one example, as described above, determination of individual position 120 is based on a field with a known intensity, including, more specifically, a field with a known intensity profile, intensity gradient, or three-dimensional intensity. In one implementation, the field of known intensity is ambient pressure, including, more specifically, liquid pressure (e.g., water pressure). As such, the field of known intensity may be sensed, for example, by a liquid pressure sensor or transducer or hydrostatic depth sensor, as an example of sensor 110 of a respective functional element 100.

As illustrated in the example of FIG. 5A, container 200, with functional elements 100 therein, is positioned in or has a first orientation, and is filled with a liquid 230, such as water, oil, alcohol, acetone, mercury or other liquid or liquid mixture, such that functional elements 100 are submerged in liquid 230. With the first orientation, liquid pressure at a respective functional element 100 is measured such that a "depth" or position of the respective functional element 100 relative to a first surface, face, or boundary of container 200, such as boundary 201, is resolved, as represented, for example, by arrow 401. As such, a first positional coordinate, such as an x-coordinate, of the respective functional element number 100 is determined. In one implementation, container 200 includes a transmitter or sensor 210 at one or more known locations such that a sensed measurement by a respective functional element 100 is compared with a sensed measurement by sensor 210.

As illustrated in the example of FIG. 5B, container 200, with functional elements 100 submerged in liquid 230 therein, is positioned in or has a second orientation. With the second orientation, liquid pressure at the respective functional element 100 is measured such that a "depth" or position of the respective functional element 100 relative to a second surface, face, or boundary of container 200, such as boundary 202, is resolved, as represented, for example, by arrow 402. As such, a second positional coordinate, such as a y-coordinate, of the respective functional element 100 is determined.

As illustrated in the example of FIG. 5C, container 200, with functional elements 100 submerged in liquid 230 therein, is positioned in or has a third orientation. With the third orientation, liquid pressure at the respective functional element 100 is measured such that a "depth" or position of the respective functional element 100 relative to a third surface, face, or boundary of container 200, such as boundary 203, is resolved, as represented, for example, by arrow 403. As such, a third positional coordinate, such as a z-coordinate, of the respective functional element 100 is determined.

Similar to the example of FIGS. 4A, 4B, 4C, container 200, with functional elements 100 fixed and submerged in liquid 230 therein, is re-oriented or rotated, as represented by arrow 221, between the first orientation of FIG. 5A and the second orientation of FIG. 5B, and re-oriented or rotated, as represented by arrow 222, between the second orientation of FIG. 5B and the third orientation of FIG. 5C. Although illustrated as being rotated ninety degrees between the first orientation and the second orientation, and rotated ninety degrees between the second orientation and the third orientation, container 200, with functional elements 100 fixed and submerged in liquid 230 therein, may be rotated a different amount (or amounts) between the first orientation and the second orientation, and/or between the second orientation and the third orientation such that the rotation (or rotations) include a non-zero orthogonal vector component (e.g., 30 degrees, 120 degrees).

In the examples described above, the field of known intensity is ambient pressure, including, more specifically, atmospheric pressure (i.e., air pressure or gas pressure) and liquid pressure (e.g., water pressure). In other examples, the field of known intensity may include light or radio signals directed from or generated by a respective source. As such, and similar to the examples of FIGS. 4A, 4B, 4C, and FIGS. 5A, 5B, 5C, container 200, with functional elements 100 fixed therein, may be re-oriented or rotated between a first orientation, a second orientation, and a third orientation, and the field of known intensity (e.g., light intensity or radio signal strength) may be sensed by a respective functional element 100 such that a position of the respective functional element 100 may be determined.

FIGS. 6A, 6B schematically illustrate an example of determining an orientation of a functional element, such as individual orientation 140 of a respective functional element 100. In one example, as described above, determination of individual orientation 140 is based on a field with a known structure. In one implementation, the field of known structure is a gravitational field. As such, the field of known structure may be sensed, for example, by an accelerometer or tilt sensor, as an example of sensor 110 of a respective functional element 100.

As illustrated in the example of FIG. 6A, container 200, with functional elements 100 therein, is positioned in or has a first orientation. With the first orientation, a direction of the gravitational field (i.e., a direction of gravitational force), as represented, for example, by arrow 410 (i.e., "down"), is sensed by a respective functional element 100. As such, a first orientation parameter relative to the sensed direction of the gravitational field, such as roll, and a second orientation parameter relative to the sensed direction of the gravitational field, such as pitch, of the respective functional element 100 is determined.

As illustrated in the example of FIG. 6B, container 200, with functional elements 100 therein, is positioned in or has a second orientation. With the second orientation, a direction of the gravitational field (i.e., a direction of gravitational force), as represented, for example, by arrow 411 (i.e., "down"), is sensed by the respective functional element 100. As such, a third orientation parameter relative to the sensed direction of the gravitational field, such as yaw, of the respective functional element 100 is determined.

In one example, container 200, with functional elements 100 fixed therein, is re-oriented or rotated, as represented by arrow 223, between the first orientation of FIG. 6A and the second orientation of FIG. 6B. In one implementation, the second orientation of FIG. 6B is orthogonal to the first orientation of FIG. 6A such that container 200 is rotated ninety degrees between the first orientation and the second orientation.

Figures 7A, 7B:
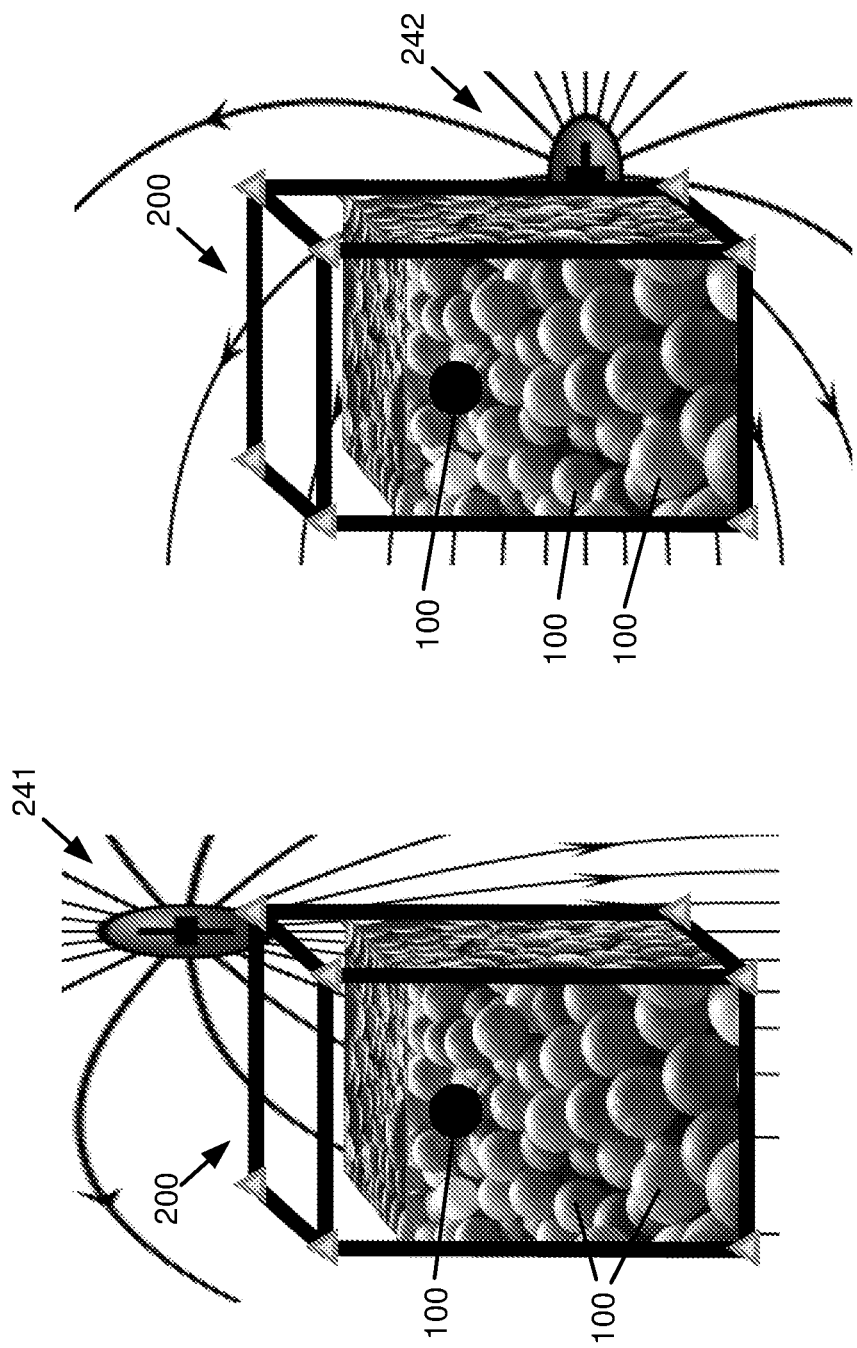
FIGS. 7A, 7B schematically illustrate another example of determining an orientation of a functional element.

FIGS. 7A, 7B schematically illustrate another example of determining an orientation of a functional element, such as individual orientation 140 of a respective functional element 100. In one example, as described above, determination of individual orientation 140 is based on a field with a known structure. In one implementation, the field of known structure is a magnetic field. As such, the field of known structure may be sensed, for example, by a magnetometer, as an example of sensor 110 of a respective functional element 100.

As illustrated in the example of FIG. 7A, container 200, with functional elements 100 therein, is positioned in a magnetic field 241 having a first orientation. With the first orientation of magnetic field 241, an orientation of the magnetic field is sensed by a respective functional element 100 such that a first orientation parameter, such as roll, and a second orientation parameter, such as pitch, of the respective functional element 100 is determined.

As illustrated in the example of FIG. 7B, container 200, with functional elements 100 therein, is positioned in a magnetic field 242 having a second orientation. With the second orientation of magnetic field 242, an orientation of the magnetic field is sensed by a respective functional element 100 such that a third orientation parameter, such as yaw, of the respective functional element 100 is determined.

In one implementation, the orientation of magnetic field 242 of FIG. 7B is orthogonal to the orientation of magnetic field 241 of FIG. 7A, and is established by re-orienting or rotating a magnetic field ninety degrees relative to functional elements 100, for example, relative to container 200, with functional elements 100 therein. As such, the first orientation includes a first orientation of the field of known structure (i.e., magnetic field), and the second orientation includes a second orientation of the field of known structure (i.e., magnetic field) rotated relative to the first orientation of the field of known structure. In another implementation, container 200, with functional elements 100 fixed therein, is re-oriented or rotated ninety degrees relative to a magnetic field to establish a first orientation of the magnetic field and a second orientation of the magnetic field relative to container 200 and functional elements 100.

Figure 8A:
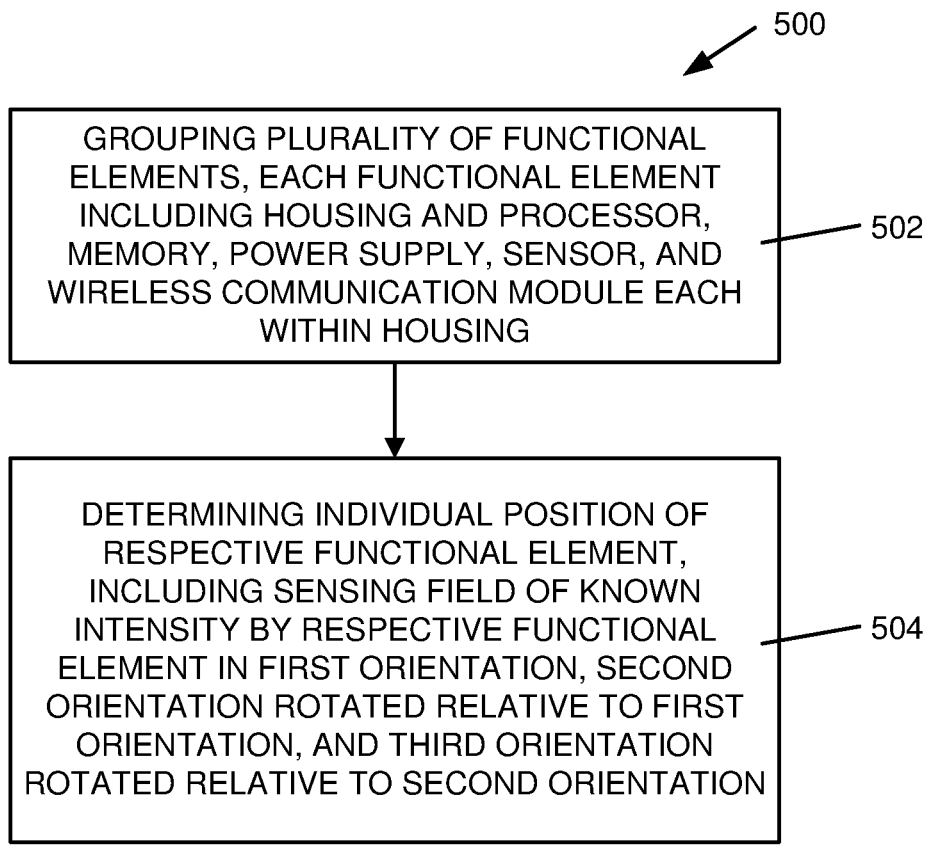
FIGS. 8A and 8B are flow diagrams illustrating an example of a method of determining a pose of a functional element.
Figure 8B:
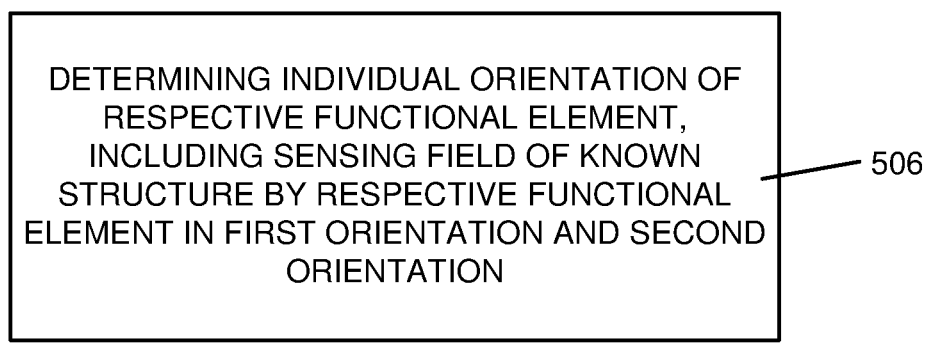

FIGS. 8A and 8B are flow diagrams illustrating an example of a method 500 of determining a pose of a functional element, such as functional element 100, as schematically illustrated, for example, in FIG. 1.

In one example, as illustrated in FIG. 8A, at 502, method 500 includes grouping a plurality of functional elements, such as functional elements 100, with each of the functional elements including a housing, such as housing 102, and a processor, such as processor 104, memory, such as memory 106, power supply, such as power supply 108, sensor, such as sensor 110, and wireless communication module, such as wireless communication module 112, each within the housing, as schematically illustrated, for example, in FIG. 1.

As such, in one example, at 504, method 500 includes determining an individual position of a respective one of the functional elements, such as individual position 120 of a respective functional element 100. In one example, determining an individual position of a respective one of the functional elements includes sensing a field of known intensity by the respective one of the functional elements in each a first orientation, a second orientation rotated relative to the first orientation, and a third orientation rotated relative to the second orientation, as schematically illustrated, for example, in FIGS. 4A, 4B, 4C and FIGS. 5A, 5B, 5C.

In one implementation, sensing the field of known intensity, for example, at 504, includes sensing atmospheric pressure by the respective one of the functional elements in each the first orientation, the second orientation, and the third orientation, as schematically illustrated, for example, in FIGS. 4A, 4B, 4C.

In another implementation, method 500 includes submerging the functional elements in liquid, such that sensing the field of known intensity, for example, at 504, includes sensing liquid pressure by the respective one of the functional elements in each the first orientation, the second orientation, and the third orientation, as schematically illustrated, for example, in FIGS. 5A, 5B, 5C.

In one example, as illustrated in FIG. 8B, at 506, method 500 further includes determining an individual orientation of the respective one of the functional elements, such as individual orientation 140 of a respective functional element 100. In one example, determining an individual orientation of the respective one of the functional elements includes sensing a field of known structure by the respective one of the functional elements in both the first orientation and the second orientation, as schematically illustrated, for example, in FIGS. 6A, 6B, and FIGS. 7A, 7B.

In one implementation, sensing the field of known structure, for example, at 506, includes sensing a direction of a gravitational field by the respective one of the functional elements in both the first orientation and the second orientation, as schematically illustrated, for example, in FIGS. 6A, 6B.

In another implementation, sensing the field of known structure, for example, at 506, includes sensing an orientation of a magnetic field by the respective one of the functional elements in both the first orientation and the second orientation, as schematically illustrated, for example, in FIGS. 7A, 7B.

Although illustrated and described as separate and/or sequential steps, the method may include a different order or sequence of steps, and may combine one or more steps or perform one or more steps concurrently, partially or wholly.

Figure 9:
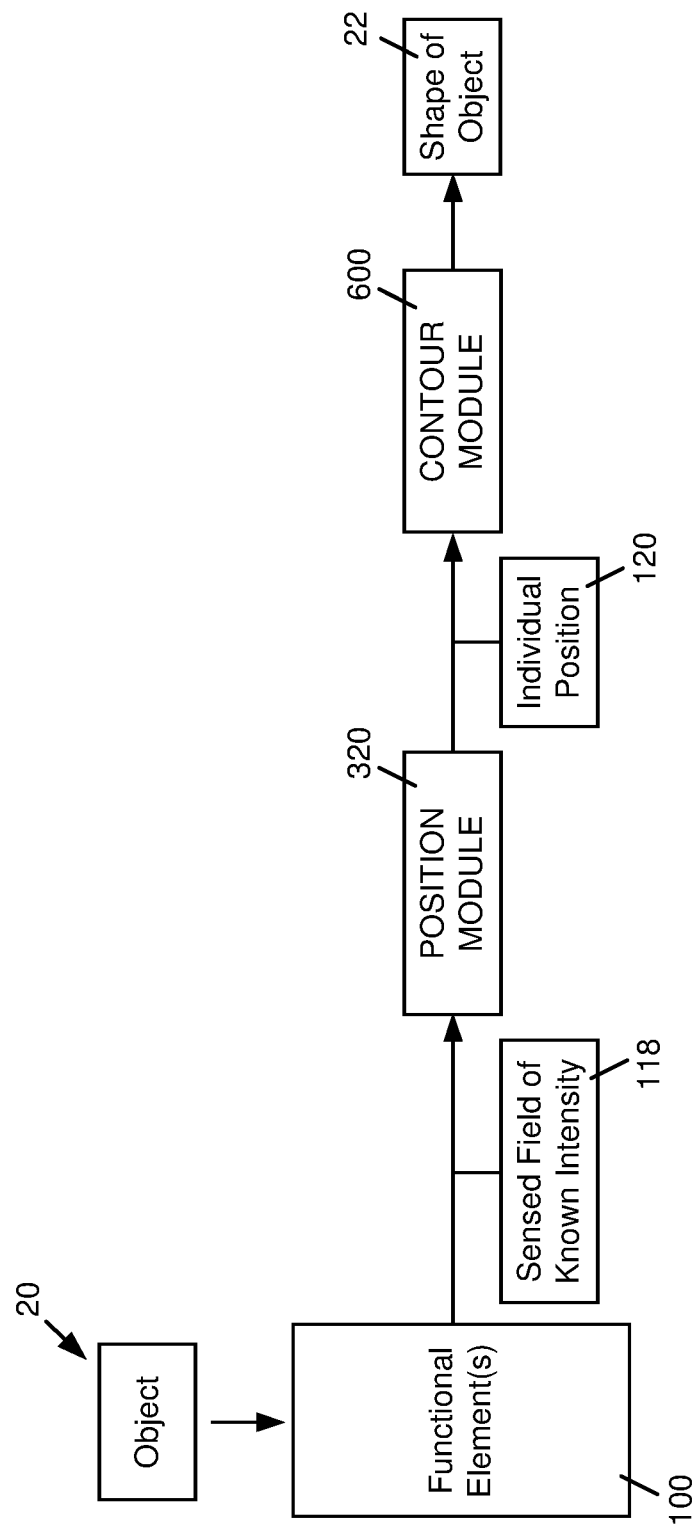
FIG. 9 is a block diagram illustrating an example of three-dimensional scanning of an object.

FIG. 9 is a block diagram illustrating an example of three-dimensional scanning of an object. In one example, as described below, a contour module 600 determines a shape or contour of an object, such as object 20, based on a position of functional elements 100 after object 20 is in or positioned in, including inserted into (at least partially or wholly) or placed within (at least partially or wholly), a collection, set, accumulation, or grouping of functional elements 100.

In one implementation, as schematically illustrated in FIG. 9, contour module 600 determines a shape 22 of object 20, including a boundary or contour of object 20, based on individual position 120 of functional elements 100 as determined, for example, by position module 320. More specifically, with object 20 in (at least partially or wholly) functional elements 100, a number of functional elements 100 contact, are contacted by, or are in contact with object 20, such that a respective position of the contacted or contacting (i.e., in-contact) functional elements 100, identify, indicate, and/or establish shape 22 of object 20. Thus, a multi-dimensional scan, namely, a three-dimensional scan of object 20 is obtained with functional elements 100.

In examples, position module 320 determines individual position 120 of functional elements 100 based on a measure of a sensed field of known intensity 118 received from a respective functional element 100, as described above. Thus, by sensing a respective position within the collection, set, accumulation, or grouping of functional elements 100, functional elements 100 identify, indicate, and/or establish shape 22 of object 20.

In one example, with object 20 positioned in (at least partially or wholly) functional elements 100, a void is created within the collection, set, accumulation, or grouping of functional elements 100. More specifically, position information is absent or a lack of position information exists amongst the collection, set, accumulation, or grouping of functional elements 100 where object 20 is located. As such, in one example, contour module 600 determines shape 22 of object 20, including a boundary or contour of object 20, based on the void within the collection, set, accumulation, or grouping of functional elements 100.

In some examples, in addition to determining shape 22 of object 20 based on an individual position of functional elements 100, contour module 600 determines shape 22 of object 20 based on an individual orientation of functional elements 100. More specifically, orientation module 340, as described above, determines individual orientation 140 of functional elements 100 after object 20 is in functional elements 100. As such, contour module 600 further determines shape 22 of object 20, including a boundary or contour of object 20, based on individual orientation 140 of functional elements 100.

Figure 10:
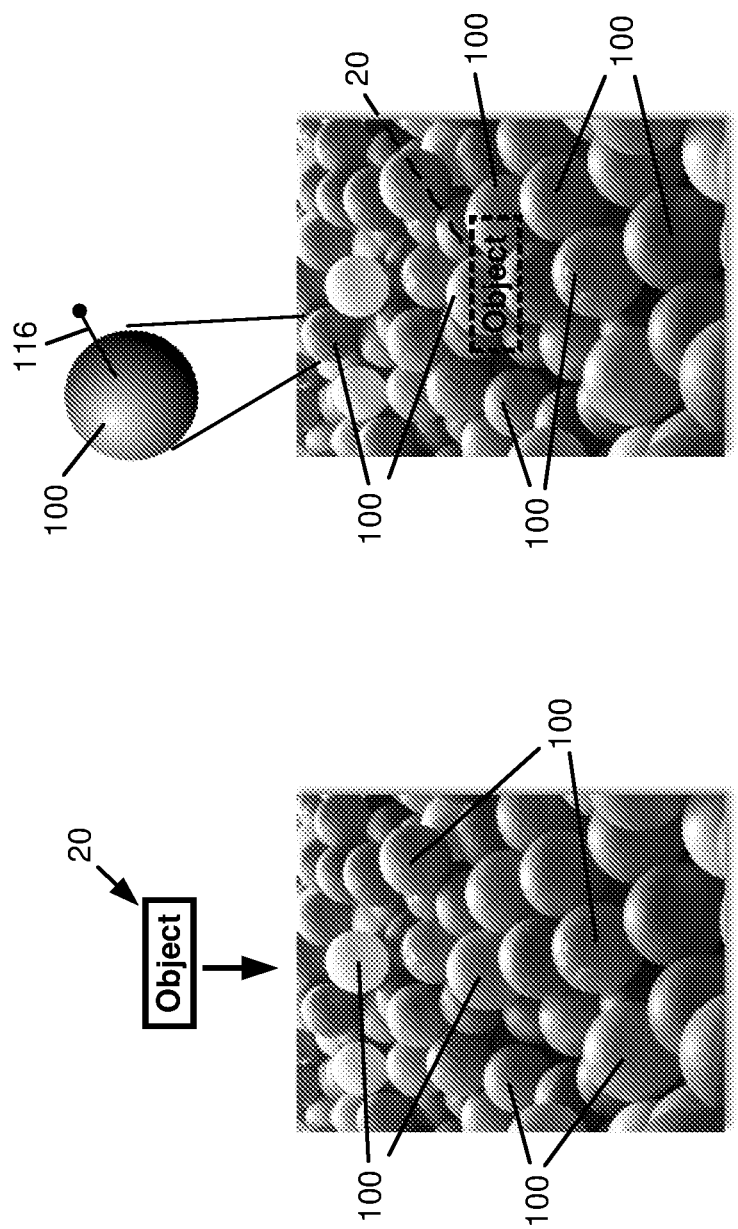
FIGS. 10A and 10B schematically illustrate an example of three-dimensional scanning of an object.

FIGS. 10A and 10B schematically illustrate an example of three-dimensional scanning of an object, such as object 20. In one example, object 20 is positioned in (at least partially or wholly) a collection, set, accumulation, or grouping of functional elements 100. As such, with object 20 in functional elements 100, an individual position 120 of functional elements 100 is determined, for example, by position module 320. Accordingly, based on individual position 120 of functional elements 100, contour module 600 determines shape 22 of object 20, including a boundary or contour of object 20.

In one example, positioning object 20 in the collection, set, accumulation, or grouping of functional elements 100 displaces a number of functional elements such that the individual position of a number of functional elements 100 after object 20 is in the collection, set, accumulation, or grouping of functional elements 100 includes a displaced position of functional elements 100. In addition, in one example, with object 20 in the collection, set, accumulation, or grouping of functional elements 100, a volume free of functional elements (i.e., a non-functional-element volume) is created within the collection, set, accumulation, or grouping of functional elements 100. Accordingly, such non-functional-element volume corresponds to a volume of object 20.

In one implementation, as schematically illustrated in the example of FIG. 10B, one or multiple functional elements 100 include a probe 116, as an example of actuator 114 (FIG. 1), which may extend from or be extended from a respective functional element 100 for contact with object 20. As such, additional position information of a respective functional element 100 in the collection, set, accumulation, or grouping of functional elements 100, including information on point contact with object 20, may be obtained and used in determining shape 22 of object 20, including a boundary or contour of object 20.

Figure 11:
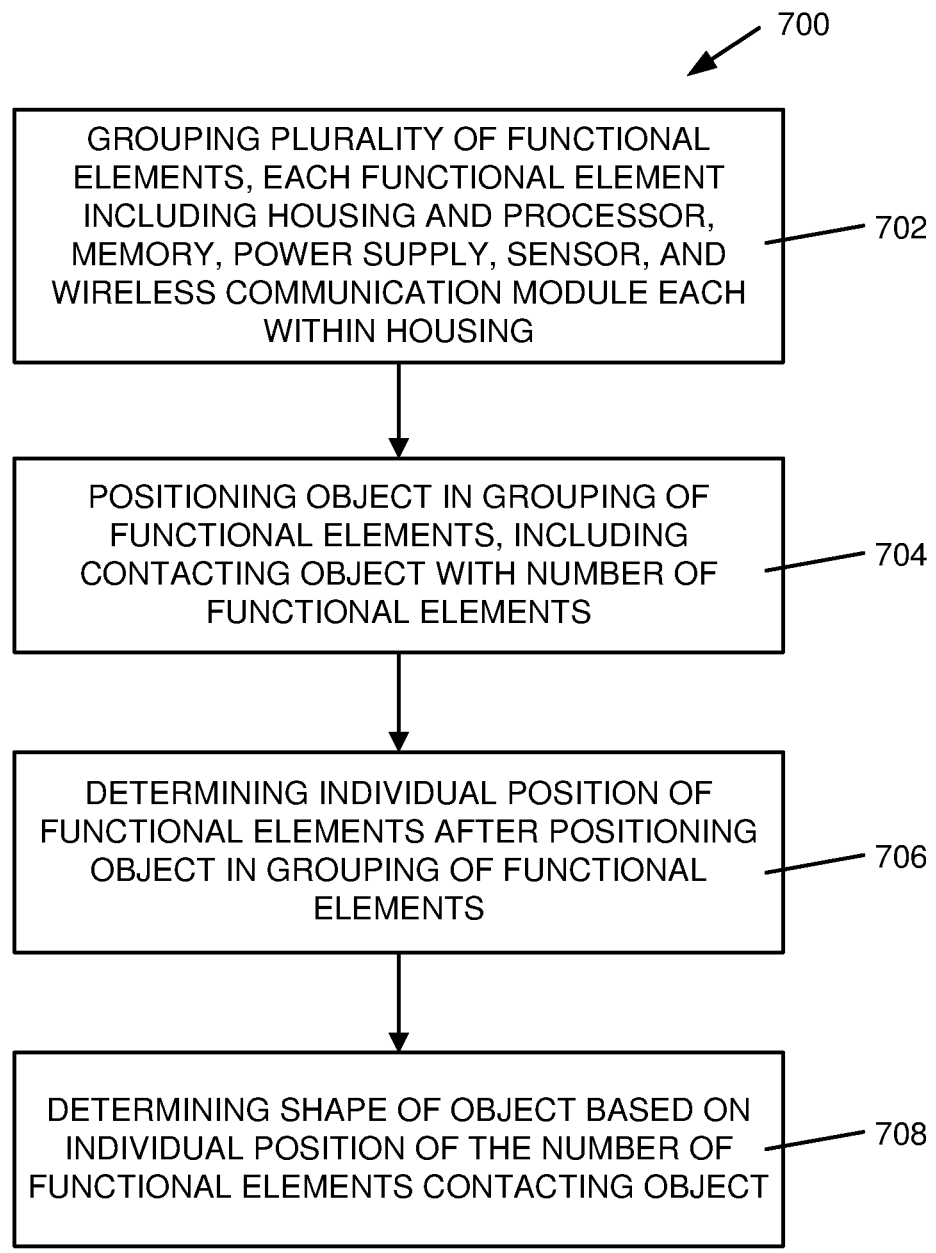
FIG. 11 is a flow diagram illustrating an example of a method of three-dimensional scanning of an object.

FIG. 11 is a flow diagram illustrating an example of a method 700 of three-dimensional scanning of an object, such as object 20, as schematically illustrated, for example, in FIG. 9 and FIGS. 10A, 10B.

In one example, as illustrated in FIG. 11, at 702, method 700 includes grouping a plurality of functional elements, such as functional elements 100, with each of the functional elements including a housing, such as housing 102, and a processor, such as processor 104, memory, such as memory 106, power supply, such as power supply 108, sensor, such as sensor 110, and wireless communication module, such as wireless communication module 112, each within the housing, as schematically illustrated, for example, in FIG. 1.

As such, at 704, method 700 includes positioning the object in the grouping of functional elements, such as positioning object 20 in functional elements 100 as schematically illustrated, for example, in FIG. 9 and FIGS. 10A, 10B. In one example, positioning the object in the grouping of functional elements includes contacting the object with a number of the functional elements, such as contacting object 20 with a number of functional elements 100, as schematically illustrated, for example, in FIG. 10B.

As such, at 706, method 700 includes determining an individual position of each of the functional elements after positioning the object in the grouping of functional elements, such as determining individual position 120 of each functional element 100 after positioning object 20 in functional elements 100, as schematically illustrated, for example, in FIG. 9 and FIGS. 10A, 10B. In one example, determining an individual position of each of the functional elements, such as determining individual position 120 of each functional element 100, includes sensing a field of known intensity by a respective one of the functional elements, such as sensing a field of known intensity by a respective functional element 100, as schematically illustrated, for example, in FIGS. 4A, 4B, 4C, and FIGS. 5A, 5B, 5C.

As such, at 708, method 700 includes determining a shape of the object based on the individual position of the number of functional elements contacting the object, such as determining shape 22 of object 20 based on individual position 120 of functional elements 100 contacting object 20, as schematically illustrated, for example, in FIG. 9 and FIGS. 10A, 10B. In one example, positioning the object in the grouping of functional elements, such as positioning object 20 in functional elements 100, includes creating a void of functional elements in the grouping of functional elements, such that determining the shape of the object, such as determining shape 22 of object 20, further includes determining the shape of the object based on the void of functional elements.

In one implementation, determining the shape of the object, such as determining shape 22 of object 20, further includes contacting the object with a probe extended from a number of the functional elements, such as probe 116 extended from functional element 100, as schematically illustrated, for example, in FIG. 10B.

Although illustrated and described as separate and/or sequential steps, the method may include a different order or sequence of steps, and may combine one or more steps or perform one or more steps concurrently, partially or wholly.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:
1. A system for three-dimensional scanning of an object, comprising:
    a set of functional elements, each of the functional elements including a housing and a processor, memory, power supply, sensor, and wireless communication module each within the housing;

a position module to determine an individual position of each of the functional elements after the object is positioned in the set of functional elements; and a contour module to determine a shape of the object based on the individual position of each of the functional elements and a void of functional elements created by the object positioned in the set of functional elements.

2. The system of claim 1, wherein the position module is to determine the individual position of a respective one of the functional elements based on a field of known intensity sensed by the respective one of the functional elements.

3. The system of claim 2, wherein the field of known intensity comprises atmospheric pressure, and each of the functional elements is to sense a magnitude of the atmospheric pressure after the object is in the set of functional elements.

4. The system of claim 2, wherein the functional elements are submerged in liquid, wherein the field of known intensity comprises liquid pressure, and each of the functional elements is to sense a magnitude of the liquid pressure after the object is in the set of functional elements.

5. The system of claim 1, wherein the individual position of each of the functional elements after the object is in the set of functional elements includes a displaced position of a number of the functional elements.

6. The system of claim 1, wherein a number of the functional elements includes a probe to be extended therefrom to contact the object.

7. The system of claim 1, wherein the functional elements are spherical in shape.

8. A system for three-dimensional scanning of an object, comprising:

an accumulation of functional elements, each of the functional elements including a housing and a processor, memory, power supply, sensor, and wireless communication module each within the housing, and each of the functional elements having a respective position after the object is positioned in the accumulation of functional elements, wherein, after the object is positioned in the accumulation of functional elements, a non-functional-element volume in the accumulation of functional elements corresponds to a volume of the object.

9. The system of claim 8, wherein each of the functional elements sense the respective position thereof.

10. The system of claim 8, wherein a number of the functional elements are in contact with the object after the object is in the accumulation of functional elements, wherein the respective position of the number of the functional elements identifies a boundary of a shape of the object.

11. A method of three-dimensional scanning of an object, comprising:

grouping a plurality of functional elements, each of the functional elements including a housing and a processor, memory, power supply, sensor, and wireless communication module each within the housing;

positioning the object in the grouping of functional elements, including contacting the object with a number of the functional elements;

determining an individual position of each of the functional elements after the positioning the object in the grouping of functional elements; and determining a shape of the object based on the individual position of the number of the functional elements contacting the object.

12. The method of claim 11, wherein determining the individual position of each of the functional elements includes sensing a field of known intensity by a respective one of the functional elements.

13. The method of claim 11, wherein positioning the object in the grouping of functional elements includes creating a void of functional elements in the grouping of functional elements, wherein determining the shape of the object further includes determining the shape of the object based on the void of functional elements.

14. The method of claim 11, wherein determining the shape of the object further includes contacting the object with a probe extended from a number of the functional elements.

15. The method of claim 11, wherein the functional elements are spherical in shape.

* * * * *